(12) United States Patent
Graff

(10) Patent No.: US 8,111,063 B2
(45) Date of Patent: Feb. 7, 2012

(54) MAGNETIC ROTATION SENSING

(75) Inventor: Tyler A. Graff, Bowdon, GA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 711 days.

(21) Appl. No.: 12/237,841

(22) Filed: Sep. 25, 2008

(65) Prior Publication Data

US 2010/0072989 A1    Mar. 25, 2010

(51) Int. Cl.
*G01B 7/30* (2006.01)
(52) U.S. Cl. .................................. 324/207.25
(58) Field of Classification Search ............. 324/207.25
See application file for complete search history.

(56) References Cited

U.S. PATENT DOCUMENTS

| | | | |
|---|---|---|---|
| 4,275,291 A | 6/1981 | Feller | |
| 4,296,411 A | 10/1981 | Romanelli et al. | |
| 4,607,527 A | 8/1986 | Sears | |
| 7,113,063 B2 | 9/2006 | Romanik et al. | |
| 7,498,953 B2 | 3/2009 | Salser et al. | |

OTHER PUBLICATIONS

U.S. Appl. No. 12/237,884, filed Sep. 25, 2008.

*Primary Examiner* — Reena Aurora
(74) *Attorney, Agent, or Firm* — Kilpatrick Townsend & Stockton LLP

(57) ABSTRACT

Embodiments for rotation sensing are provided. The device may include a magnet apparatus comprising a magnet, the magnet apparatus configured to be coupled to a dial apparatus of a meter. Also included may be a magnetic field sensor configured to be coupled to a dial cover. When the magnet apparatus is coupled to the dial apparatus and the magnetic field sensor is coupled to the dial cover, the distance between the magnet and the magnetic field sensor may be a function of the strength of the magnet and the sensitivity of the magnetic field sensor. Also, the magnetic field sensor may be configured to generate an analog signal. The device may also include a memory component storing logic configured to detect an abnormal condition based on a data value of the analog signal. The detected condition may be magnetic tampering, a missing dial cover, and/or a missing dial hand.

20 Claims, 7 Drawing Sheets

MAGNETIC ROTATION SENSING

TECHNICAL FIELD

Embodiments discussed herein are generally related to utility meters and, more particularly, are related to magnetic rotation sensing of a dial apparatus in a meter.

BACKGROUND

Utility meters are used by utility companies to measure the amount of a resource consumed by users. The resource may be gas, electricity, water, etc. Such meters may be located at the user's premises, which may be commercial or residential. These meters include a rotation device that indicates the amount of a resource consumed. For some utility meters, this rotation device may be referred to as a dial, an index, and/or a register. The meters may be configured so that the volume of the resource passing through a metering valve is proportional to the number of rotations of the rotation device, and the dial, index, and/or register may indicate the amount of consumption of the resource according to the number the rotations of the rotating device.

Additionally, the number of rotations of the rotating device may be sensed. Under current rotation sensing techniques, tampering of the meter may be difficult to detect. More specifically, if someone tampers with the meter by removing a dial cover or by placing a magnet near the meter, the tampering is difficult to detect because often utility meters have zero-use as a normal state. Similarly, with these techniques, it may be difficult to detect a malfunction. As a nonlimiting example, in the case of meters employing a dial hand to indicate consumption, if the dial hand falls off the utility meter, the dial will revert to zero. Because meters may have zero-use as a normal state, it can be difficult to remotely detect that a dial hand has fallen off the meter, and lost revenue can result.

SUMMARY

Embodiments of the present disclosure provide for rotation sensing. In some embodiments, the rotation sensing device may include a magnet apparatus including a magnet. The magnet apparatus may be configured to be coupled to a dial apparatus of a meter. The rotation sensing device may also include a magnetic field sensor configured to be coupled to a dial cover. When the magnetic field sensor is coupled to the dial cover, a distance between the magnet of the magnet apparatus and the magnetic field sensor may be a function of a magnetic field strength of the magnet and a sensitivity of the a magnetic field sensor. The magnetic field sensor may be configured to generate a signal based upon the sensed magnetic field of the magnet.

In some embodiments, a method for sensing the rotation of a dial apparatus of a metering device is provided. The method may include generating a magnetic field that varies according to the rotation of a dial apparatus. The method may also include sensing using a magnetic field sensor the magnetic field when the magnetic field sensor is within a magnetic field sensing distance of the magnetic field. The method may further include receiving a signal corresponding to the sensing of the magnetic field sensor. Also, the method may include detecting an abnormal condition based on the signal.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the disclosure may be better understood with reference to the following drawings. The components in the drawings are not necessarily to scale, emphasis instead being placed upon illustrating the principles of the present disclosure. Moreover, in the drawings, like reference numerals designate corresponding parts throughout the several views.

DETAILED DESCRIPTION

Meters may include a rotation device that indicates the amount of a resource consumed. For some utility meters, this rotation device may be referred to as a dial, an index, and/or a register. The meters may be configured so that the volume of the resource passing through a metering valve, as a nonlimiting example, is proportional to the number of rotations of the rotation device, and the dial, index and/or register may indicate the amount of consumption of the resource according to number the rotations of the rotating device. To simplify the present disclosure, the rotation device will be referred to hereinafter as a dial.

Figure 1:
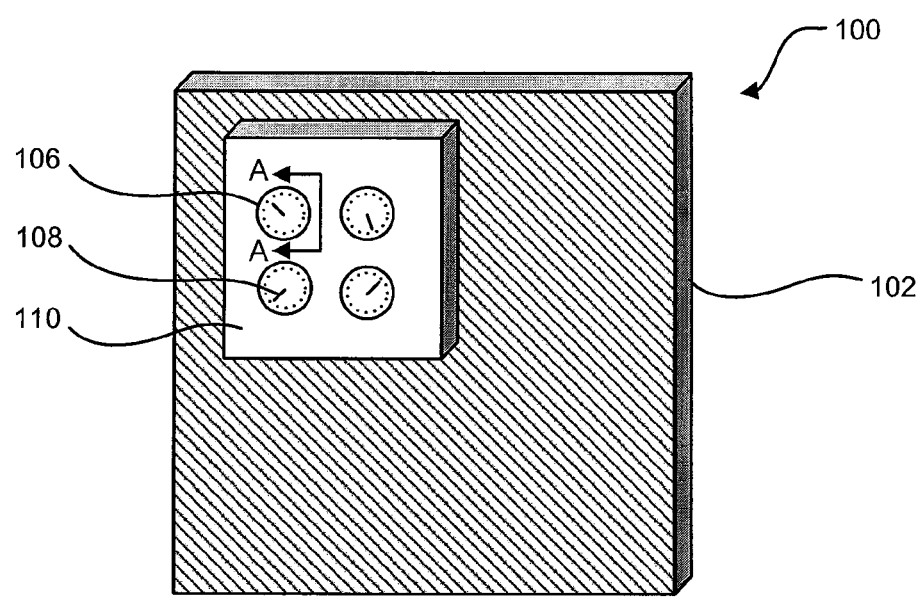
FIG. 1 is a front perspective view of an exemplary metering device.

FIG. 1 is a front perspective view of one nonlimiting example of a metering device 100. The metering device 100 may include one or more of a meter 102, a dial 106, a dial hand 108, and/or a dial cover 110. As a resource is consumed, the dial hand 108 may rotate proportional to consumption and indicate the amount consumed by pointing to a number on the dial 106.

Figure 2:
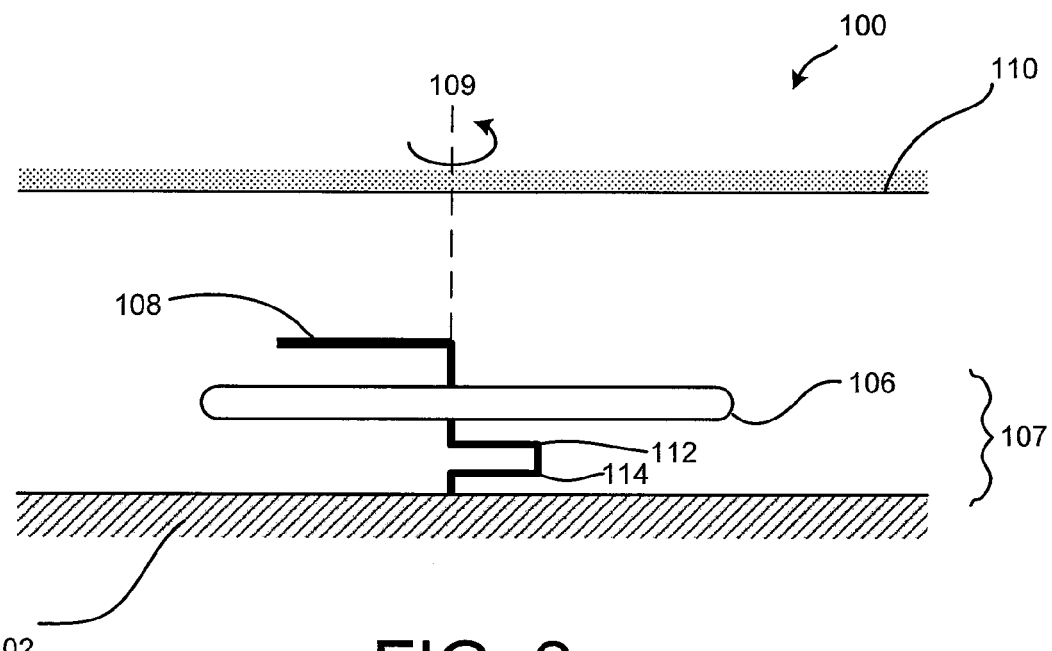
FIG. 2 is a cross-sectional view of the metering device illustrated in FIG. 1.

FIG. 2 illustrates a cross-sectional view of the exemplary metering device 100 illustrated in FIG. 1 as seen through the line denoted "A." In this view, the coupling of the dial 106 to a meter-drive-to-dial linkage 112 and a meter drive 114 can be seen. In some cases the meter drive 114 may be referred to as the "wriggler" or the "dog." Also coupled to the dial 106 may be the dial hand 108. The combination of the dial hand 108, the dial 106, the meter-drive-to-dial linkage 112 and meter drive 114 is hereinafter referred to as a dial apparatus 107. The dial 106, the dial hand 108 and the meter-drive-to-dial linkage 112 may be configured to rotate about an axis of rotation 109. Although the rotation about the axis of rotation 109 is depicted as being counter-clockwise in FIG. 2, the rotation about the axis of rotation 109 may be clockwise. Also shown is the dial cover 110, which may be configured to shield the dial 106 from weather, flying debris, and/or otherwise protect the dial apparatus 107.

Figure 3A:
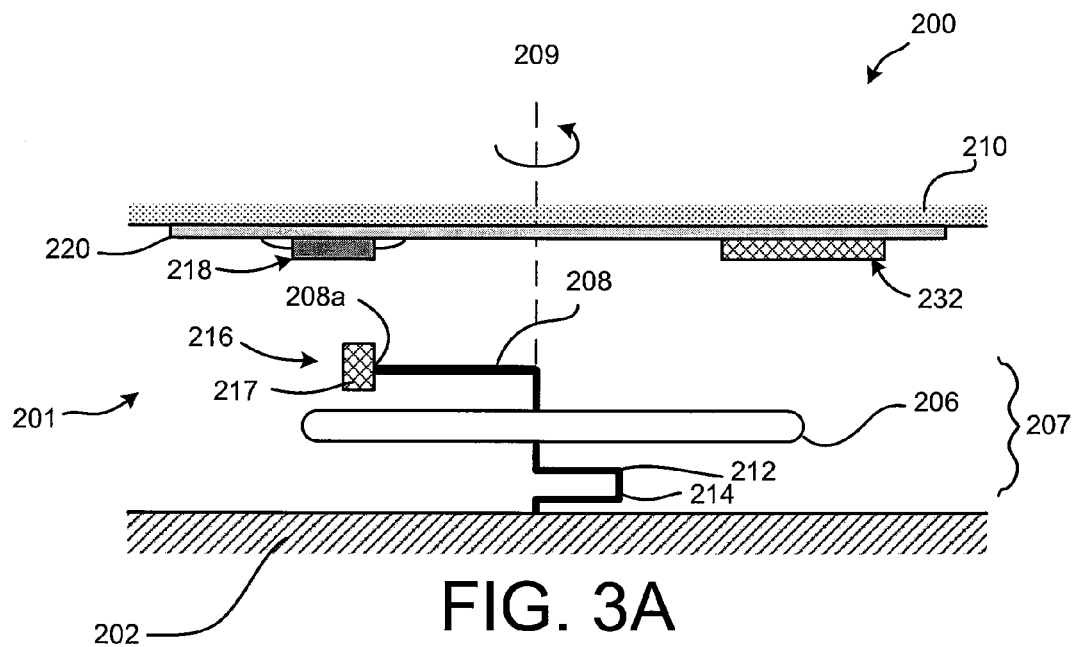
FIG. 3A is a cross-sectional view of a metering device including an installation of one exemplary embodiment of a rotation sensing configuration including a magnet apparatus coupled to a dial hand.

FIG. 3A is a cross-sectional view of a nonlimiting example of a metering device 200. As shown in FIG. 3A, the metering device 200 may include one or more of a meter 202, a dial 206, a dial hand 208, meter-drive-to-dial linkage 212, a meter drive 214, and/or a dial cover 210, similar to the metering device 100 shown in FIG. 2. Also similar to the metering device 100, a dial apparatus 207, which may include the dial 206, the dial hand 208, and/or the meter-drive-to-dial linkage 212, may be configured to rotate about an axis of rotation 209.

Additionally, FIG. 3A includes one exemplary embodiment of a rotation sensing configuration 201 that is installed on the metering device 200. The rotation sensing configuration 201 includes a magnet apparatus 216 and a magnetic field sensor 218. The magnet apparatus 216 may include a magnet 217 and may be coupled to the dial apparatus 207. The magnet apparatus 216 may also include a structure for coupling the magnet 217 to the dial apparatus 207. This coupling may be accomplished in one of a variety of ways such as by glue, adhesive, screw, slide clip, a housing and/or other attachment or coupling means. The magnet 217, which produces a magnetic field, may be an electromagnet and/or a permanent magnet, such as neodymium. In some embodiments, more than one magnet 217, more than one magnet apparatus 216 and/or more than one magnetic field sensor 218 may be included in the rotation sensing configuration 201.

FIG. 3A also illustrates the magnetic field sensor 218, which in one nonlimiting example, may be coupled to a printed circuit board 220. The printed circuit board 220 may be configured to be coupled to a dial cover 210 as well. In some embodiments, such as the nonlimiting example depicted in FIG. 3A, a processing unit 232 may be located locally with respect to the magnetic field sensor 218. The processing unit 232 may be coupled to the magnetic field sensor 218 using the printed circuit board 220. Still, in some embodiments, the processing unit 232 may be located remotely from the magnetic field sensor 218. Similarly, the processing unit 232 may be in communication with the magnetic field sensor 218 via a wire, cable, or one or more of a variety of connecting devices. It may be useful to locate the processing unit in a location remote from the magnetic field sensor 218 in order to avoid obscuring a view of the dial apparatus 207.

The processing unit 232 may include an abnormal condition detection logic and/or or rotation counting logic for counting rotations of the dial apparatus 207. The printed circuit board 220 may be, as shown in this nonlimiting example, coupled to a dial cover 210.

In some embodiments, such as the nonlimiting example shown in FIG. 3A, the magnet apparatus 216 may be coupled to the dial apparatus 207 by coupling the magnet 217 of the magnet apparatus 216 to the dial hand 208. In FIG. 3A, the magnet apparatus 216 is depicted as being coupled to a peripheral end 208a of the dial hand 208.

Figure 3B:
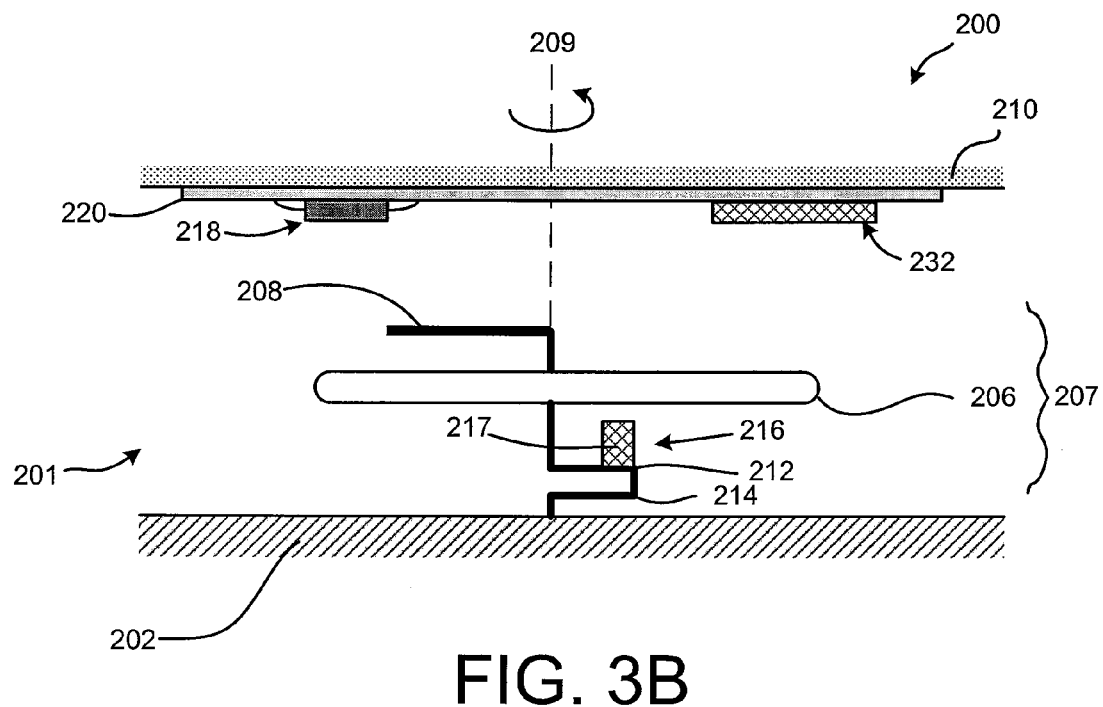
FIG. 3B is a cross-sectional view of the metering device illustrated in FIG. 1 including an installation of an exemplary embodiment of the rotation sensing configuration including a magnet apparatus coupled to a meter-drive-to-dial linkage.

Additionally, FIG. 3B includes another nonlimiting and exemplary embodiment of a rotation sensing configuration 201 that is installed on the metering device 200. The rotation sensing configuration 201 includes a magnet apparatus 216 and a magnetic field sensor 218. The magnet apparatus 216 may include a magnet 217 and be coupled to the dial apparatus 207. The magnet apparatus 216 may also include a structure for coupling the magnet 217 to the dial apparatus 207. This coupling may be accomplished in one of a variety of ways such as by glue, adhesive, screw, slide clip, a housing, and/or other attachment or coupling means. The magnet 217, which produces a magnetic field, may be an electromagnet and/or a permanent magnet such as neodymium.

FIG. 3B also illustrates a magnetic field sensor 218 coupled to a printed circuit board 220, which may include logic for detecting an abnormal condition and/or counting rotations of the dial hand 208. The printed circuit board 220 may be coupled to a dial cover 210. In some embodiments, such as depicted in FIG. 3B, the magnet 217 of the magnet apparatus 216 may be coupled to the dial apparatus 207 at the meter-drive-to-dial linkage 212.

When the rotation sensing configuration 201 is installed on a metering device 200 as illustrated in the nonlimiting examples of FIGS. 3A and/or 3B, the magnetic field sensor 218 may be positioned at a distance from the magnet apparatus 216 that is a function of the strength of the magnet 217 on the magnet apparatus 216 and the sensitivity of the magnetic field sensor 218. The selection of magnet 217 (e.g., according to its magnetic field strength) and/or the magnetic field sensor 218 (e.g., according to its sensitivity) may be a function of a distance from the dial apparatus 207, the dial hand 208, the dial 206, and/or the meter-drive-to-dial linkage 212 to the dial cover 210.

The magnetic field sensor 218 may be configured to detect a magnetic field of the magnet 217 on the magnet apparatus 216 and output an analog signal corresponding to the sensed magnetic field. The magnetic field sensor 218 may include a Hall effect sensor, which may be configured to sense a magnetic field based on a phenomenon called the Hall effect. The Hall effect relates to the nature of current flow in a conductor when a magnetic field is present. When a non-parallel magnetic field is applied to the path of current, the path of the current may become curved and moving charges may accumulate on one face of the conductor. This condition may cause equal and opposite charges to accumulate on the opposite face of the conductor. This distribution of charge can create a potential difference, the Hall voltage, between opposite sides of the electrical conductor, and the Hall effect sensor may generate the Hall voltage as an output, which includes an analog signal. In its simplest form, a Hall effect sensor may operate as an analog transducer, outputting a Hall voltage proportional to an applied magnetic field. Other magnetic field sensors may be used instead of or in conjunction with the Hall effect sensor.

Once the rotation sensing configuration 201 is installed on the dial apparatus 207 and the dial cover 210 of a metering device 200, the rotation sensing configuration 201 may operate such that as the dial apparatus 207 rotates about an axis of rotation 209, the magnetic field sensor 218 may sense a magnetic field that may be periodic or varying according to the rotation of the dial apparatus 207. The rotation sensing configuration 201 may also operate to detect an abnormal condition using a processing unit 232 coupled to the magnetic field sensor 218, which may be coupled to the printed circuit board 220. The detected abnormal condition may be one of a variety of abnormal conditions such as a magnetic tampering, a missing dial hand 208, and a missing dial cover 210.

Figure 4A:
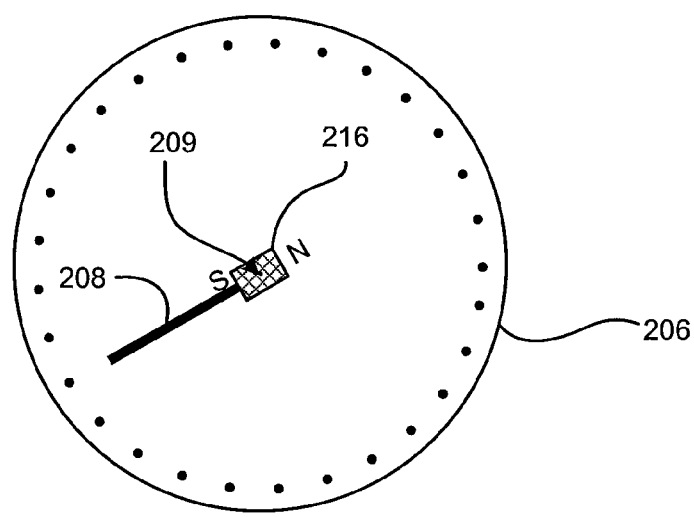
FIG. 4A is a top view of an exemplary dial apparatus including one nonlimiting example of an installed exemplary magnet apparatus.
Figure 4B:
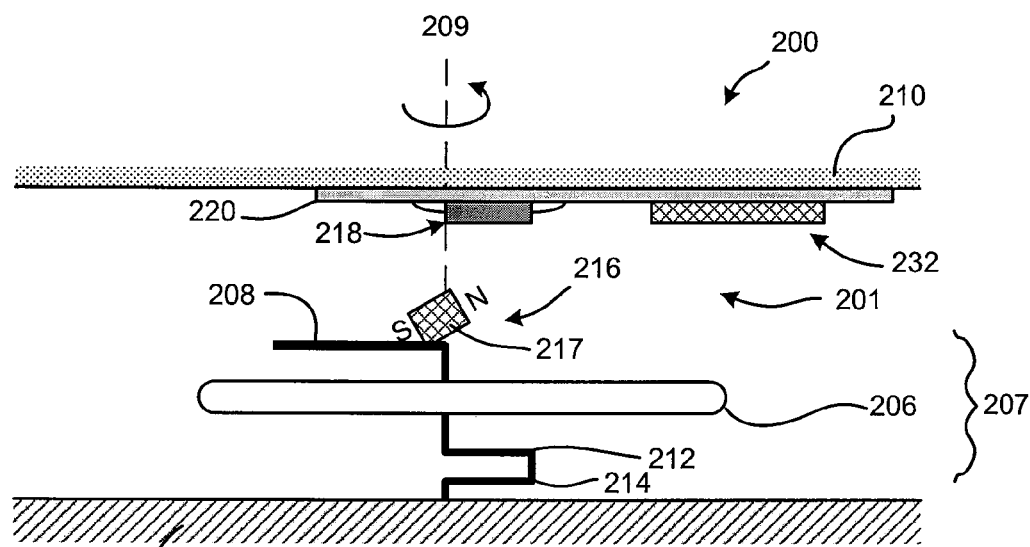
FIG. 4B is a cross-sectional view of the metering device illustrated in FIG. 1, including an exemplary embodiment of the installed exemplary magnet apparatus illustrated in FIG. 4A.

FIG. 4A is a front view of an exemplary dial apparatus including one nonlimiting example of an installed exemplary magnet apparatus 216, and FIG. 4B is a cross-sectional view including an exemplary embodiment of the installed exemplary magnet apparatus 216 illustrated in FIG. 4A. In some embodiments, as illustrated in FIGS. 4A and 4B, the magnet apparatus 216 may be coupled to the dial hand 208 proximate to axis of rotation 209. In the example shown in FIG. 4B, the magnet apparatus 216 may be coupled to the dial hand 208 such that the magnet 217 may be tilted. The magnet 217 may be positioned such that it is tilted at an angle offset from the axis of rotation 209. The angle of the tilt may be a function of the magnetic field strength of the magnet 217, a distance from the dial 206 to the dial cover 210, and/or a distance from the magnetic field sensor 218 to the axis of rotation 209. FIG. 4A illustrates a front view of the dial 206 and the magnet apparatus 216 coupled to the dial 206 proximate to the axis of rotation 209.

Figure 5:
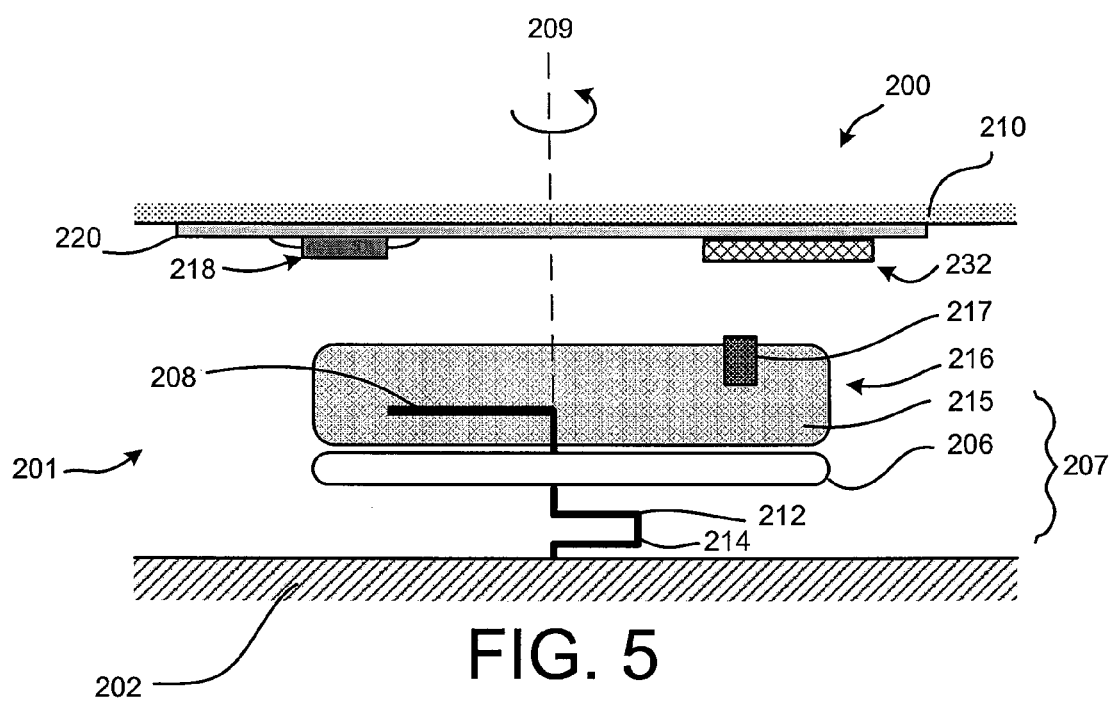
FIG. 5 is a cross-sectional view of the metering device illustrated in FIG. 1 including an installation of an exemplary embodiment of the rotation sensing configuration including a housing.

FIG. 5 is a cross-sectional view of a metering device 200 including an installation of an exemplary embodiment of the rotation sensing configuration 201 including a housing 215. In some embodiments, among others, the magnet apparatus 216, which includes a magnet 217, may also include a housing 215. The housing 215 may enclose the dial hand 208 of the dial apparatus 207 loosely or more rigidly in accordance with the situation. The magnet 217 may be positioned on the magnet apparatus 216 such that as the enclosed dial hand 208 rotates about the axis of rotation 209, the magnet 217 may also rotate about the axis of rotation 209. This housing 215 may be made of plastic and/or another non-magnetic material that may be light enough not to cause the dial hand 208 to fall off the dial apparatus 207.

Figure 6:
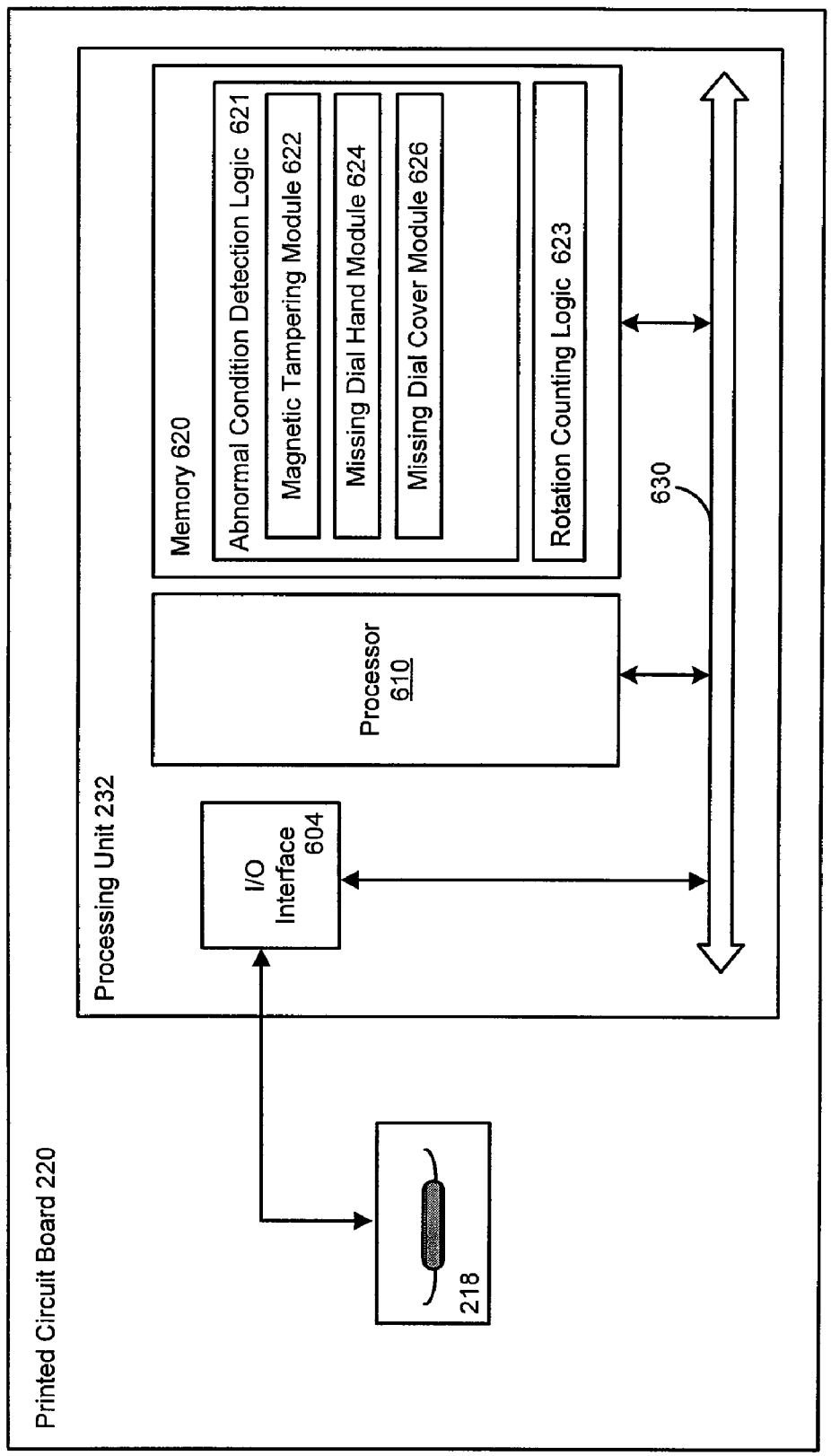
FIG. 6 is a block diagram illustrating a nonlimiting example of a processing unit of a rotation sensing configuration.

FIG. 6 is a block diagram illustrating a nonlimiting example of a processing unit 232 of the rotation sensing configuration 201 illustrated in FIGS. 3A, 3B, 4B, and/or 5. The processing unit 232 may include a processor 610, a memory 620, a bus 630, and an I/O interface 604. Also, the processor 610, the memory 620, and the I/O interface 604 may be coupled to the bus 630. The processing unit 232 may be coupled to a printed circuit board 220. Also coupled to the printed circuit board 220 may be a magnetic field sensor 218. Further, the magnetic field sensor 218 may be coupled to the I/O interface 604 of the processing unit 232.

The memory 620 may include abnormal condition detection logic 621 and/or rotation counting logic 623. In the nonlimiting example illustrated in FIG. 6, the abnormal condition detection logic 621 may include a magnetic tampering module 622, a missing dial hand module 624, and/or a missing dial cover module 626. The abnormal condition detection logic 621 may include more or fewer modules than those illustrated.

In some embodiments, the processing unit 232 may be located remotely from the location of the magnetic field sensor 218, which may be coupled to the printed circuit board 220. It may be useful to locate the processing unit 232 in a location remote from the location of the magnetic field sensor 218 in order to avoid obscuring a view of the dial apparatus 207.

Figure 7:
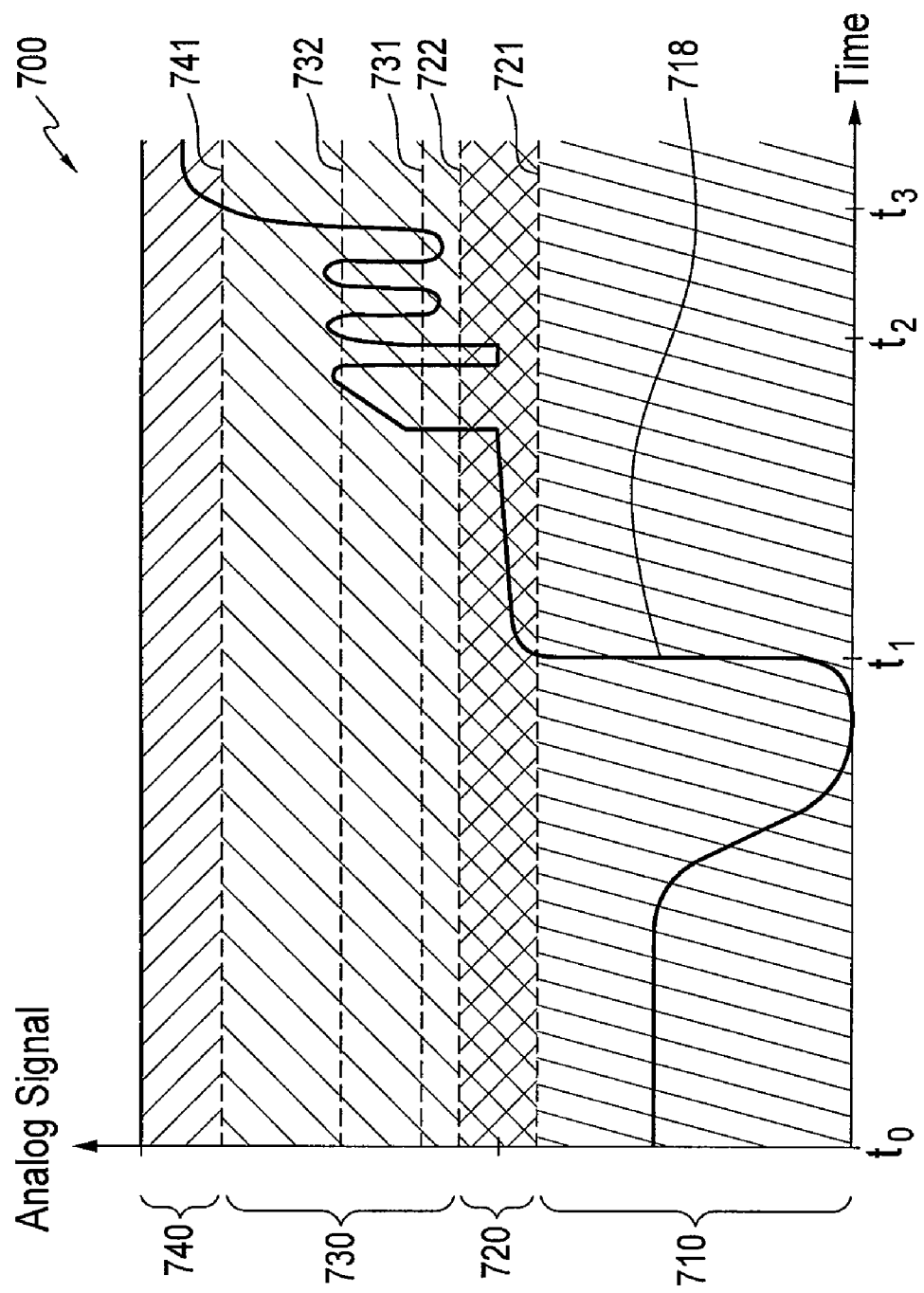
FIG. 7 is an exemplary plot of the analog signal generated by the magnetic field sensor under various conditions versus time for the exemplary embodiments shown in FIGS. 3A, 3B, 4A, 4B and/or 5.

FIG. 7 is a plot of a nonlimiting example of an analog signal 718 generated by the magnetic field sensor 218 of the rotation sensing configuration 201, when installed, under various conditions versus time. This analog signal 718 may be generated by the magnetic field sensor 218 as the magnetic field sensor 218 senses the magnetic field of the magnet 217 on the magnet apparatus 216.

Also shown in FIG. 7 are several levels. The lowest level illustrated is the kZeroL level 721. Data values that are less than this level may be within the low magnetic tampering range 710. The magnetic field sensor 218 may generate an analog signal 718 having a data value in this range as indicated between $t_0$ and $t_1$ on the time axis. The magnetic field sensor 218 may sense a magnetic field causing the magnetic field sensor 218 to generate a data value in that range when a magnet (e.g., with the southern end of the magnet closest to the metering device 200) has been placed proximate to the dial apparatus 207 in order to tamper with the metering device 200. The magnetic tampering module 622, which may be included in the abnormal condition detection logic 621 in the processing unit 232, may determine whether a data value of the analog signal 718 is within the low magnetic tampering range 710. Hence, the rotation sensing configuration 201 may be configured to detect magnetic tampering.

The next range depicted in FIG. 7 to be discussed is the cover off/dial hand missing range 720. The cover off/dial hand missing range 720 may be defined as being greater than the kZeroL level 721 and less than the kZeroH level 722. When the magnetic field sensor 218 generates an analog signal 718 having a data value in cover off/dial hand missing range 720, this may indicate that the dial cover 210 may be removed and/or may be missing. Also, a data value in the cover off/dial hand missing range 720 may indicate that at least of a portion of the dial apparatus 207 may be missing. In the embodiment discussed above with respect to FIG. 3A, the magnet apparatus 216 may be coupled to a peripheral end 208a of the dial hand 208, and if the dial hand 208 falls off, this condition may be detected by the rotation sensing configuration 201. Dial hands 208 may be press-fitted to the dial apparatus 207, and may sometimes fall off. In some embodiments, the dial cover 210 may even include a ramp at the bottom of the dial cover 210 to facilitate the dial hand 208 rolling or sliding away from the dial apparatus 207 and thus, the magnetic field sensor 218. Data values may be shown in cover off/dial hand missing range 720 in FIG. 7 as generated between the time values of $t_1$ and $t_2$.

The missing dial hand module 624, which may be included in the abnormal condition detection logic 621 in the processing unit 232, may determine whether a data value of the analog signal 718 is within the cover off/dial hand missing range 720. Similarly, the missing dial hand module 624, which may be included in the abnormal condition detection logic 621 in the processing unit 232, may determine whether a data value of the analog signal 718 is within the cover off/dial hand missing range 720. Hence, the conditions of a missing dial cover 210 and/or a missing dial hand 208 may be detected by the rotation sensing configuration 201.

FIG. 7 also includes a valid count range 730. When the dial apparatus 207 is rotating, the rotations of the dial apparatus 207 may be counted when the data values of the analog signal 718 are with the valid count range 730. The valid count range 730 may include data values greater than the kZeroH level 722 and less than the KTamperH level 741. Also, included within the valid count range 730 may be the kCountL level 731 and the kCountH level 732. These levels 731, 732 may be used as reference voltages for counting each half rotation and/or full rotation of the dial apparatus 207 when the dial apparatus 207 is rotating. The periodic nature of the analog signal 718 during rotation of the dial apparatus 207 may be indicated in FIG. 7 for time values between $t_2$ and $t_3$. The rotation counting logic 623, which may be included in the processing unit 232, may determine whether a data value of the analog signal 718 is within the valid count range 730 and/or may count the number of rotations of the dial apparatus 207. Hence, in addition to the detection of certain conditions described above, the rotation sensing configuration 201 may also count the number of rotations of the dial apparatus 207.

Another range depicted in FIG. 7 may be the high magnetic tampering range 740. The high magnetic tampering range 740 may be defined by data values that meet and/or are greater than the kTamperH level 741. A data value of the analog signal 718 in this range may indicate that a magnet may have been placed near the metering device 200. Data values may be in the high magnetic tampering range 740 when the northern end of the magnet is placed closest to the metering device 200. FIG. 7 may illustrate data values in this range for time values greater than $t_3$. The magnetic field of the external magnet may even push the magnetic field sensor 218 to saturation. The magnetic tampering module 622, which may be included in the abnormal condition detection logic 621 in the processing unit 232, may determine whether a data value of the analog signal 718 is within the high magnetic tampering range 740. The magnetic tampering module 622 may be configured to determine whether a data value of the analog signal 718 is within the high magnetic tampering range 740 and/or within the low magnetic tampering range 710.

When the rotation sensing configuration 201 is installed, the levels and/or thresholds discussed above may be fixed based upon specifications determined by the magnetic field strength of the magnet 217, the sensitivity of the magnetic field sensor 218, and/or the likely distance from the dial cover 210 to the magnet apparatus 216. The levels and/or thresholds may be dynamically set based upon recent sampling of the analog signal 718 during the rotations of the dial apparatus 207. Dynamic thresholding may be useful when the strength of the magnet 217 varies as a function of temperature (e.g., varying from season to season).

Although the rotation sensing configuration 201 may be depicted in the drawings as being installed on and/or part of a metering device 200, other embodiments may include a kit comprising the magnet apparatus 216, the magnetic field sensor 218 and printed circuit board 220 with a coupled processing unit 232 including abnormal condition detection logic 621 for detecting the various conditions discussed above. This kit may be used for retro-fitting the rotation sensing configuration 201 discussed above onto a dial apparatus 107 already installed on an existing metering device 100.

Figure 8:
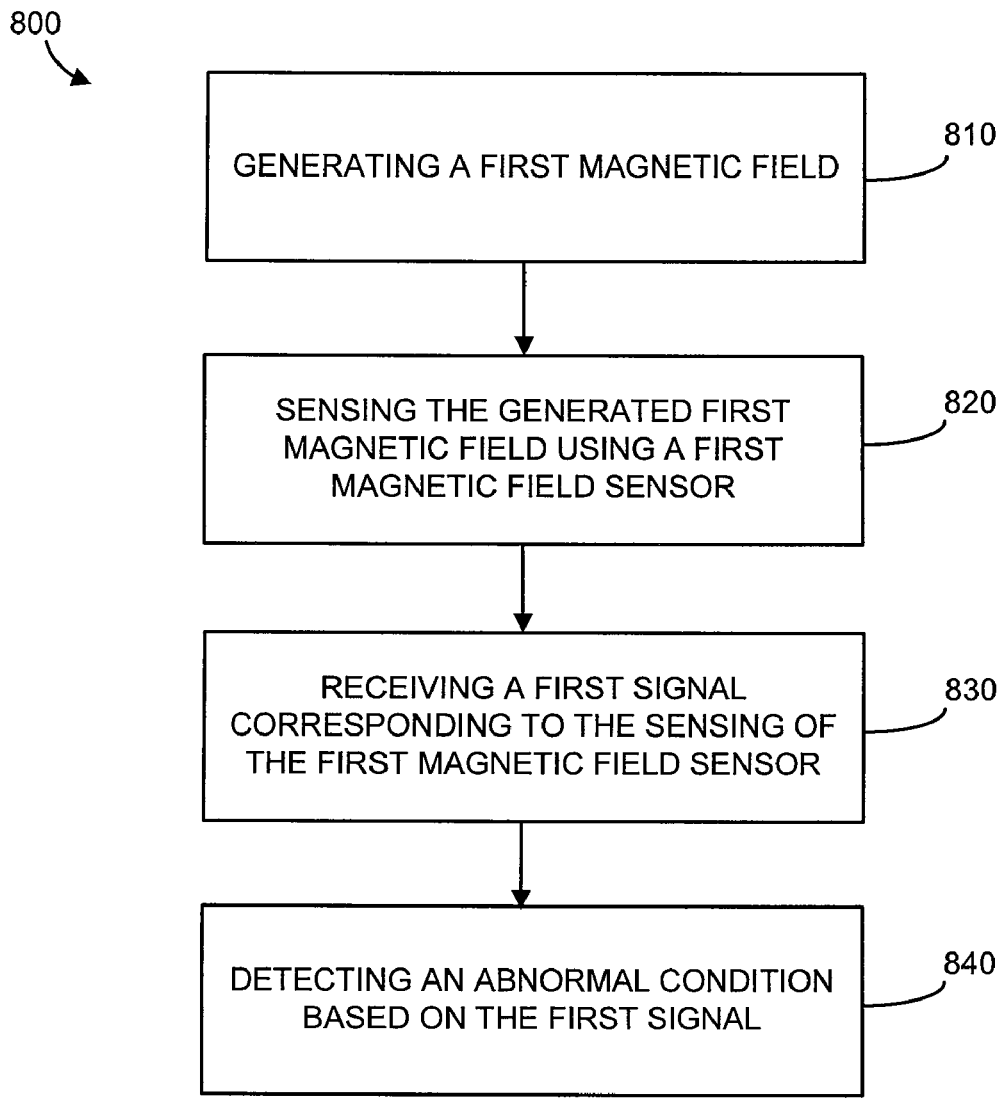
FIG. 8 is a block diagram illustrating an exemplary embodiment of a method for rotation sensing.

FIG. 8 illustrates one nonlimiting example of a process 800 for sensing the rotation of a dial apparatus 207 of a metering device 200 shown, for example, in the nonlimiting embodiments illustrated in FIGS. 3A, 3B, 4A, 4B and/or 5. The process 800 includes blocks 810, 820, 830 and/or 840. In block 810, a magnetic field is generated that varies according to the rotation of a dial apparatus 207. The magnetic field may be generated using a magnet apparatus 216 comprising a magnet 217. The magnet 217 may be an electromagnet or a permanent magnet such as neodymium. In some embodiments, more than one magnet apparatus 216 and/or more than one magnet 216 may be used to generate the magnetic field. The magnet apparatus 216 may be coupled to a dial apparatus 207 on a metering device 200 such that when the dial apparatus 207 rotates about an axis of rotation 209 of the dial apparatus 207, the magnet apparatus 216 also rotates about the axis of rotation 209. The generated magnetic field may vary periodically due to the rotation of the magnet apparatus 216 about the axis of rotation 209.

In block 820, a magnetic field sensor 218 may be used to sense the generated magnetic field when the magnetic field sensor 218 is within a magnetic field sensing distance of the generated magnetic field. In some embodiments, more than one magnetic field sensor 218 may be used to sense the generated magnetic field. The magnetic field sensor 218 may include a Hall effect sensor and/or another sensor capable of sensing a magnetic field and outputting a signal. The signal may be an analog signal 718. When the dial apparatus 207 rotates, the magnetic field strength sensed by the magnetic field sensor 218 may vary periodically as the dial apparatus 207 rotates because the magnet 217 may move toward and then away from the magnetic field sensor 218 as the dial apparatus 207 rotates.

In block 830, the signal corresponding to the sensing of the magnetic field sensor may be received. The magnetic field sensor 218 may generate this signal based on the sensed magnetic field that is generated using the magnet apparatus 216 coupled to the dial apparatus 207. The signal may be an analog signal 718.

In block 840, an abnormal condition may be detected based on the signal. The abnormal condition may include rotation of the dial apparatus 207, magnetic tampering, a missing dial cover 210, and/or a missing dial hand 208. Magnetic tampering may occur when a magnet is placed near the metering device 200 and/or the dial apparatus 207. A person may tamper with a metering device 200 with a magnet in order to distort the consumption measured by the metering device 200. The abnormal condition of magnetic tampering may be detected by a magnetic tampering module 622, which may be in the abnormal condition detection logic 621 within the processing unit 232, that determines that a data value of the signal meets, is greater than, and/or less than a predetermined threshold or a level.

The abnormal condition of a missing dial cover 210 may occur when the dial cover 210 has fallen off or if someone has taken the dial cover 210 off. A person may take the dial cover 210 off in order to proceed with tampering with the meter. When the dial cover 210 is missing, the magnetic field sensor 218 coupled to the dial cover 210 may no longer sense the magnetic field of the magnet apparatus 216. The abnormal condition of a missing dial cover 210 may be detected by a missing dial cover module 626, which may be in the abnormal condition detection logic 621 within the processing unit 232, that determines that a data value of the signal meets, is greater than, and/or less than a predetermined threshold or a level The abnormal condition of a dial hand 208 missing may occur when the dial hand 208 has fallen of the dial apparatus 207 or otherwise been removed, and the condition of the dial hand 208 missing may be detected. When the dial hand 208 is missing and the magnet apparatus 216 had been coupled to the dial hand 208, the magnetic field sensor 218 may no longer sense the magnetic field of the magnet apparatus 216. The condition of a missing dial hand 208 may be detected by a missing dial hand module 624, which may be in the abnormal condition detection logic 621 within the processing unit 232, that determines that a data value of the signal meets, is greater than and/or less than a predetermined threshold or a level.

In addition, the number of rotations of the dial apparatus 207 may be counted. The counting may be achieved by determining the number of periods in the analog signal generated by the magnetic field sensor 218. One period of the signal may correspond to one rotation of the dial apparatus 207. Rotation counting logic 623, which may be included a memory 620 of a processing unit 232, may count the number of rotations of the dial apparatus 207.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the programs, logic or modules listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium could include an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the certain embodiments of this disclosure can include embodying the functionality described in logic embodied in hardware or software-configured mediums.

It should be emphasized that the above-described embodiments of the present invention are merely possible examples of implementations, merely set forth for a clear understanding of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

Therefore, at least the following is claimed:

1. A rotation sensing device, comprising:
   a magnet apparatus comprising a magnet, the magnet apparatus configured to be mounted to a dial apparatus of a meter; and
   a magnetic field sensor configured to be mounted to a dial cover,
   wherein when the magnetic field sensor is mounted to the dial cover, a distance between the magnet of the magnet apparatus and the magnetic field sensor is a function of a magnetic field strength of the magnet and a sensitivity of the magnetic field sensor,
   wherein the magnetic field sensor is configured to generate a signal based upon the sensed magnetic field of the magnet, and wherein the dial apparatus of the meter comprises a dial hand, and wherein the magnet apparatus is configured to be mounted to the dial hand of the dial apparatus.

2. The rotation sensing device of claim 1, wherein the magnetic field sensor is coupled to a printed circuit board that is coupled to the dial cover.

3. The rotation sensing device of claim 1, further comprising a memory component that stores logic configured to detect an abnormal condition based on a data value of the generated signal, wherein the abnormal condition is selected from the group consisting of: magnetic tampering, a missing dial cover, and a missing dial hand.

4. The rotation sensing device of claim 3, wherein the magnetic field sensor is coupled to a printed circuit board that is coupled to the dial cover, and wherein the memory component that stores the logic is coupled to the printed circuit board.

5. The rotation sensing device of claim 1, wherein the magnet of the magnet apparatus is coupled to a peripheral end of the dial hand.

6. The rotation sensing device of claim 1, wherein the dial apparatus of the meter comprises meter-drive-to-dial linkage, and wherein the magnet apparatus is configured to be mounted to the meter-drive-to-dial linkage.

7. The rotation sensing device of claim 1, wherein the magnetic field sensor includes a Hall effect sensor.

8. The rotation sensing device of claim 1, wherein the magnet apparatus further comprises a housing, wherein the housing is configured to enclose the dial hand.

9. A method for sensing the rotation of a dial apparatus of a metering device, comprising:
   generating a magnetic field that varies according to the rotation of a dial apparatus, wherein a magnet apparatus comprising a magnet is mounted to the dial apparatus;
   sensing the generated magnetic field when a magnetic field sensor is within a magnetic field sensing distance of the generated magnetic field, wherein the magnetic field sensor is mounted to a dial cover;
   receiving a signal corresponding to the sensing of the magnetic field sensor; and
   detecting an abnormal condition based on the signal, and wherein the dial apparatus of the meter comprises a dial hand, and wherein the magnet apparatus is mounted to the dial hand of the dial apparatus.

10. The method of claim 9, wherein the detecting further comprises determining whether a data value of the received signal meets a predetermined threshold.

11. The method of claim 9, wherein the detected condition is selected from the group consisting of: magnetic tampering, a missing dial cover, and a missing dial hand.

12. The method of claim 9, wherein the dial apparatus of the meter comprises meter-drive-to-dial linkage, and wherein the magnet apparatus is mounted to the meter-drive-to-dial linkage.

13. A system for rotation sensing, comprising:
   a dial apparatus;

a magnet apparatus comprising a magnet, the magnet apparatus mounted to the dial apparatus; and a magnetic field sensor mounted to a dial cover, the dial cover covering the dial apparatus, wherein the distance between the magnet of the magnet apparatus and the magnetic field sensor is a function of a magnetic field strength of the magnet and a sensitivity of the magnetic field sensor, wherein the magnetic field sensor is configured to generate a signal based upon the sensed magnetic field, and wherein the dial apparatus of the meter comprises a dial hand, and wherein the magnet apparatus is configured to be mounted to the dial hand of the dial apparatus.

14. The system of claim 13, wherein the magnetic field sensor is coupled to a printed circuit board that is coupled to the dial cover.

15. The system of claim 13, further comprising a memory component that stores logic configured to detect an abnormal condition based on a data value of the generated signal, and wherein the abnormal condition is selected from the group consisting of: magnetic tampering, a missing dial cover, and a missing dial hand.

16. The system of claim 15, wherein the magnetic field sensor is coupled to a printed circuit board that is coupled to the dial cover, and wherein the memory component that stores logic is coupled to the printed circuit board.

17. The system of claim 13, wherein the magnet of the magnet apparatus is coupled to a peripheral end of the dial hand.

18. The system of claim 13, wherein the dial apparatus of the meter comprises meter-drive-to-dial linkage, and wherein the magnet apparatus is configured to be mounted to the meter-drive-to-dial linkage.

19. The system of claim 13, wherein the magnetic field sensor includes a Hall effect sensor.

20. The system of claim 13, wherein the magnet apparatus further comprises a housing, wherein the housing is configured to enclose the dial hand.

* * * * *